United States Patent

Smith et al.

[11] Patent Number: 5,962,096
[45] Date of Patent: Oct. 5, 1999

[54] FLEXIBLE TUBE AND METHOD OF MAKING

[75] Inventors: Roger P. Smith, Napoleon; Thomas J. Krall, Toledo, both of Ohio

[73] Assignee: Owens-Illinois Plastic Products Inc., Toledo, Ohio

[21] Appl. No.: 08/804,509

[22] Filed: Feb. 24, 1997

Related U.S. Application Data

[62] Division of application No. 08/228,048, Apr. 15, 1994, Pat. No. 5,632,951.

[51] Int. Cl.⁶ .......................... B65D 35/08; B65D 37/00
[52] U.S. Cl. .................. 428/35.7; 428/36.9; 428/195; 222/107; 222/215; 264/509; 264/539; 427/493
[58] Field of Search .................... 222/92, 107, 215, 222/206; 206/277; 428/36.9, 36.91, 36.92, 35.7, 42, 195; 264/509, 524, 539; 427/493

[56] References Cited

U.S. PATENT DOCUMENTS

| | | | |
|---|---|---|---|
| 1,116,523 | 11/1914 | Westlake | 215/44 |
| 1,172,447 | 2/1916 | Forte | 53/331.5 |
| 1,227,297 | 5/1917 | Neidlinger | 264/132 |
| 2,562,523 | 7/1951 | Brunet | 156/198 |
| 2,710,987 | 6/1955 | Sherman | 264/513 |
| 2,724,329 | 11/1955 | Lucas | 101/126 |
| 2,764,829 | 10/1956 | Kingman | 222/215 |
| 2,908,034 | 10/1959 | Hackett | 264/539 |
| 2,911,673 | 11/1959 | Soubier | 24/457 |
| 3,019,480 | 2/1962 | Cheney | 264/539 |
| 3,032,810 | 5/1962 | Soubier | 264/539 |
| 3,115,682 | 12/1963 | Soubier et al. | 425/131.1 |

(List continued on next page.)

FOREIGN PATENT DOCUMENTS

| | | |
|---|---|---|
| 268539 | 5/1988 | European Pat. Off. . |
| 0334468 | 9/1989 | European Pat. Off. . |
| 0497709 | 8/1992 | European Pat. Off. . |
| 0582517 | 2/1994 | European Pat. Off. . |
| 0622311 | 11/1994 | European Pat. Off. . |
| 2167559 | 8/1973 | France . |
| 2646408 | 11/1990 | France . |
| 2669306 | 5/1992 | France . |
| 2680721 | 3/1993 | France . |
| 2685224 | 6/1993 | France . |
| 2710984 | 9/1978 | Germany . |
| 55-118834 | 9/1980 | Japan . |
| 2-219752 | 9/1990 | Japan . |
| 3115341 | 5/1991 | Japan . |
| 6211256 | 8/1994 | Japan . |
| 2023088 | 12/1979 | United Kingdom . |
| 2237000 | 4/1991 | United Kingdom . |

OTHER PUBLICATIONS

Arthur N. Skeels, Jr., Guide to Plastic Bottle Decoration SPE Journal, vol. 27, May 1971.

*Primary Examiner*—Rena L. Dye

[57] ABSTRACT

A flexible plastic tube and a method of forming a flexible plastic tube includes injection molding a finish having an opening, extruding a tube integrally with the finish by relevant movement of the finish with respect to an extruder, moving the finish axially away from the extruder while continuing continuously extruding the tube, closing a blow mold about the extruded tube, blowing the tube into an integral container body having a closed bottom, opening the molds to provide an integral flexible tube with a finish thereon. Thereafter the method includes decorating the body with indicia, cutting the closed end of the tube leaving an open-ended tube of the end opposite the finish, and applying a closure to the finish. Subsequently, the tube is filled through the open end and the open end is closed. The decorating includes rotating the tube about the longitudinal axis of the tube while engaging the finish and bottom. The step of decorating preferably includes rotating the container relative to a silk screen printing device. The step of injection molding and extrusion molding preferably includes injecting and extruding linear low density polyethylene. A closure is applied before or after cutting the bottom from the container.

8 Claims, 4 Drawing Sheets

U.S. PATENT DOCUMENTS

| | | | |
|---|---|---|---|
| 3,144,493 | 8/1964 | Santelli | 264/51 |
| 4,098,932 | 7/1978 | Frische | 427/374.1 |
| 4,118,452 | 10/1978 | Myers et al. | 264/529 |
| 4,175,993 | 11/1979 | Robertson | 156/567 |
| 4,188,179 | 2/1980 | Linss et al. | 264/529 |
| 4,265,948 | 5/1981 | Hayes et al. | 206/277 |
| 4,305,902 | 12/1981 | Uhlig | 244/211.12 |
| 4,434,915 | 3/1984 | Kirk, Jr. | 222/153.13 |
| 4,529,469 | 7/1985 | Jorss | 156/360 |
| 4,580,702 | 4/1986 | Hatakeyama et al. | 222/107 |
| 4,598,839 | 7/1986 | Dombroski et al. | 222/92 |
| 4,636,166 | 1/1987 | Franks et al. | 264/509 |
| 4,806,091 | 2/1989 | Linss et al. | 425/529 |
| 4,806,092 | 2/1989 | Linss et al. | 425/529 |
| 4,806,093 | 2/1989 | Linss et al. | 425/529 |
| 4,808,105 | 2/1989 | Linss et al. | 425/529 |
| 5,150,782 | 9/1992 | Richter | 198/394 |
| 5,156,303 | 10/1992 | Yamamoto et al. | 222/215 |
| 5,201,984 | 4/1993 | Bedin | 156/566 |
| 5,224,585 | 7/1993 | Naka et al. | 198/867.13 |
| 5,273,741 | 12/1993 | Gaftar et al. | 222/107 |
| 5,398,485 | 3/1995 | Osifchin | 53/490 |
| 5,407,742 | 4/1995 | Tavss et al. | 222/107 |
| 5,632,951 | 5/1997 | Smith et al. | 264/509 |
| 5,656,346 | 8/1997 | Hirt | 206/277 |

FLEXIBLE TUBE AND METHOD OF MAKING

This is a divisional of application Ser. No. 08/228,048 filed on Apr. 15, 1994, now U.S. Pat. No. 5,632,951.

This invention relates to the manufacture of flexible tubes utilized for containing and dispensing viscous products such as personal care products and the like.

BACKGROUND AND SUMMARY OF THE INVENTION

In one method of manufacture of such flexible tubes, a fitment defining a threaded neck is attached to an open-ended tube and then the product is filled through the other end of the tube and the other end is closed.

In another method of making such flexible tubes, a hollow container having an integral neck is formed, as by blow molding, the base of the container is severed from the container, the container is placed on a mandrel whereupon decoration is applied to the open-ended container, a closure is applied to the finish and then the container is filled through the open end and the open end is sealed.

Among the objectives of the present invention are to provide a flexible tube having exceptional decoration or indicia; which incorporates a finish that requires no trimming; and wherein the decoration can be applied by conventional silk screening equipment.

In accordance with the invention, the method of forming a flexible plastic tube comprises injection molding a finish having an opening, extruding a tube integrally with the finish by relevant movement of the finish with respect to an extruder orifice, moving the finish axially away from the extruder orifice while continuing continuously extruding the tube, closing a blow mold about the extruded tube, blowing the tube into an integral container body having a closed bottom, opening the molds to provide an integral flexible tube with a finish thereon. Thereafter the method consists of decorating the body with indicia, and cutting the closed end of the tube leaving an open-ended tube of the end opposite the finish, and applying a closure to the finish. A closure is applied either before or after cutting the bottom from the container. Preferably the closure is applied to the finish after decorating. Subsequently, the tube is filled through the open end and the open end is sealed. The step of decorating includes rotating the tube about the longitudinal axis of the tube while engaging the finish and bottom. The step of decorating preferably comprises rotating the container relative to a silk screen printing device. The step of injection molding and extrusion molding preferably comprises injecting and extruding linear low density polyethylene. However, high density polyethylene and low density polyethylene may be used.

DESCRIPTION OF THE PREFERRED EMBODIMENT

Figure 1:
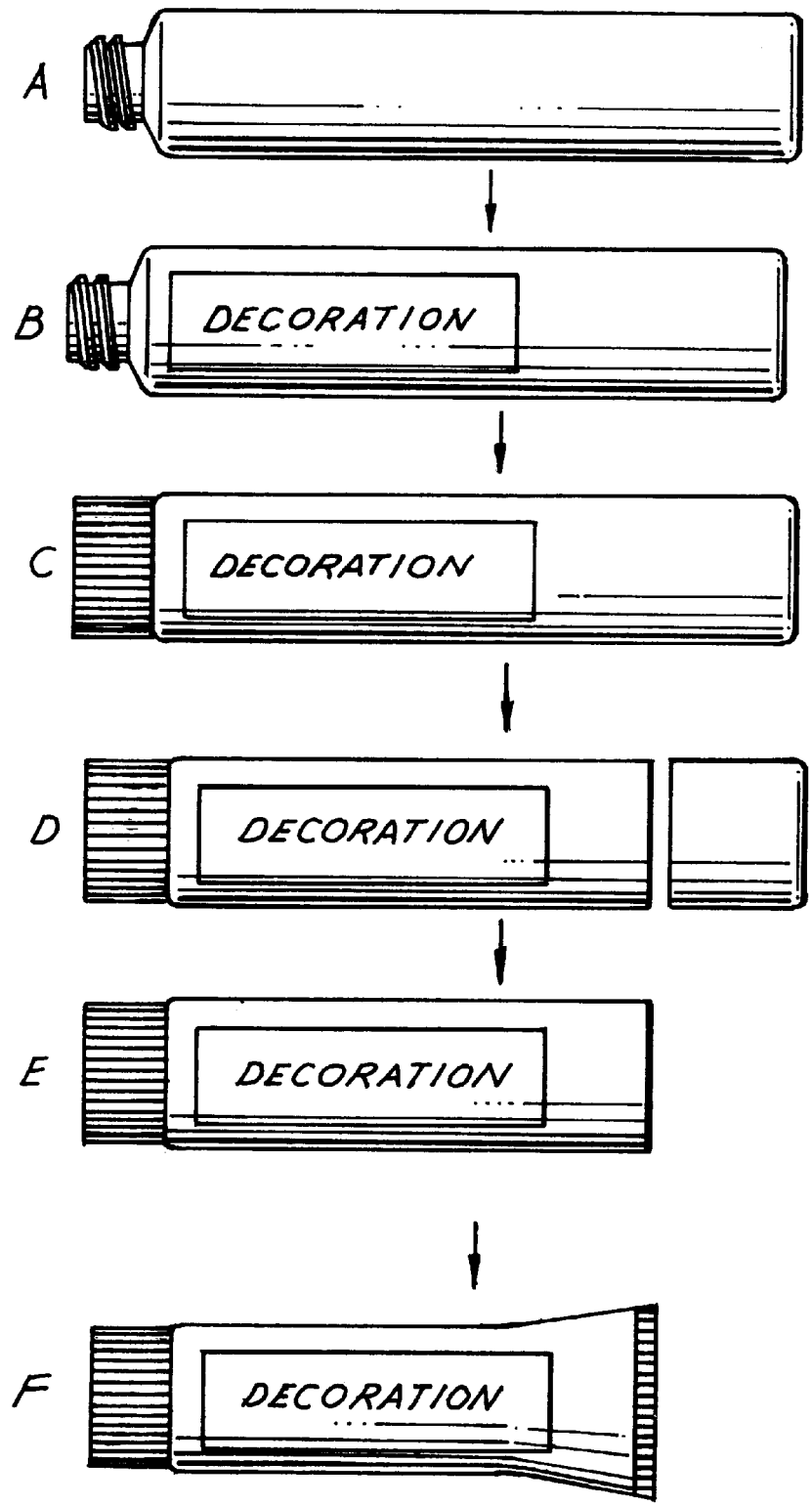
FIG. 1 is a diagram of the steps in making the flexible plastic tube embodying the invention.

Referring to FIG. 1 which is a schematic view of the succession of steps A–F to produce a filled container, the first step A comprises making a hollow plastic container by a method and apparatus wherein the neck or finish of the container is first injection molded, then a tube is extruded integrally with the injection molded finish, molds are closed about the tube and the tube is blown to form a container. Such a method and apparatus is shown in U.S. Pat. Nos. 2,710,987 and 2,911,673, incorporated herein by reference, and embodied in what has become known as a BC-3 machine.

As further shown in FIG. 1, the hollow blown container is then applied with indicia or decoration in one or more colors and designs through step B as may be desired. Step C of FIG. 1 shows applying a closure C to the container. The bottom of the container is then cut off as in step D leaving an open-ended tube as shown in step E. Step E shows the tube with the closure thereon as delivered to a customer. The purchaser of the open-ended tube fills the tube with the viscous product through the open end and then seals the open end as at F.

A closure can be applied either before or after decorating, herein shown as applied after the first decorating step B. Preferably, the closure is applied after decorating.

Figure 2:
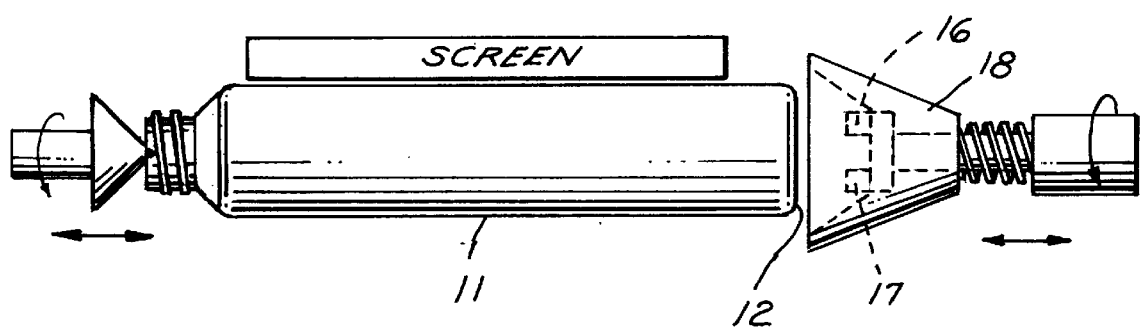
FIG. 2 is a diagram of an apparatus for silk screen decorating of the container.
Figure 3:
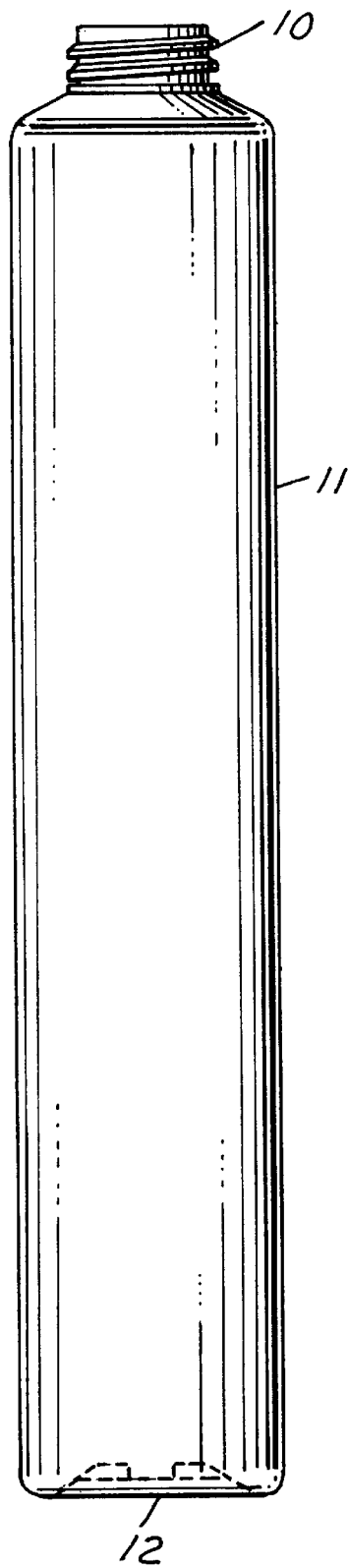
FIG. 3 is an elevational view of the container which is used to make the tube.

In accordance with the invention, the decorating steps are performed by rotating the container with respect to silk screen printer stations P, as shown in FIG. 2, by clamping the container and rotating the container relative to the station. Alternatively, decorating can be by in-mold labeling during blow molding of the tube or by heat bonding a label after the container is blown.

Referring to FIGS. 3–6, the container preferably comprises the injection molded finish 10, the extruded side wall or body 11 sufficiently thin thickness that it is flexible, and the integral bottom wall 12 which is thicker and relatively rigid to allow for driving the tube to rotate the tube in the capping and decorating operations. The wall 11 is preferably of substantially constant thickness, for example, ±0.006 in.

Figure 4:
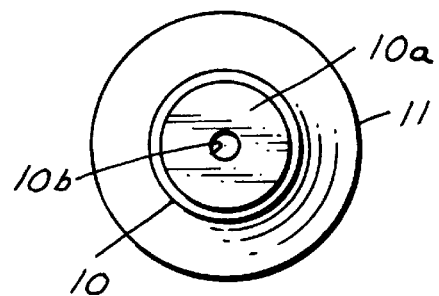
FIG. 4 is a top plan view.
Figure 5:
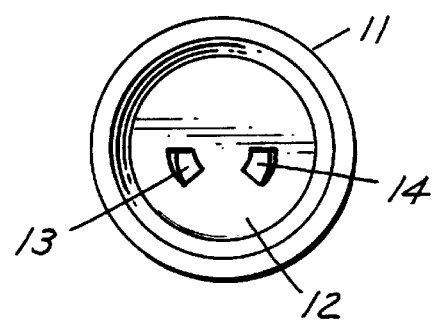
FIG. 5 is a bottom plan view.
Figure 6:
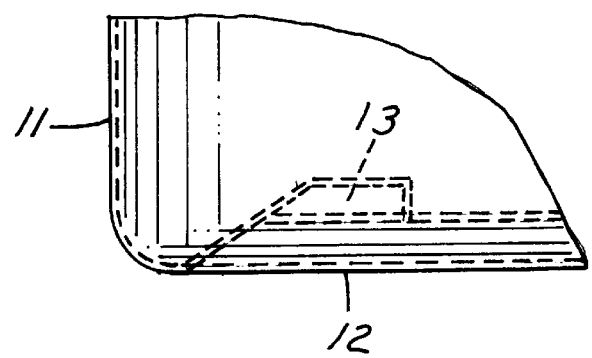
FIG. 6 is a fragmentary view of a portion of the lower end of the container.

As shown in FIGS. 5 and 6, the bottom wall 12 is formed with indentations or recesses 13, 14 which are utilized so that they can be engaged by lugs 16, 17 of a chuck 18 (FIG. 2) for the printing and application of the closure. As shown in FIG. 4, the finish 10 preferably includes a top or transverse wall 10a having a centrally located dispensing opening 10b.

The container is preferably made of linear low density polyethylene. A preferred composition is linear low density polyethylene having a dispersion index of 5. However, high density polyethylene and low density polyethylene may be used.

Figure 7:
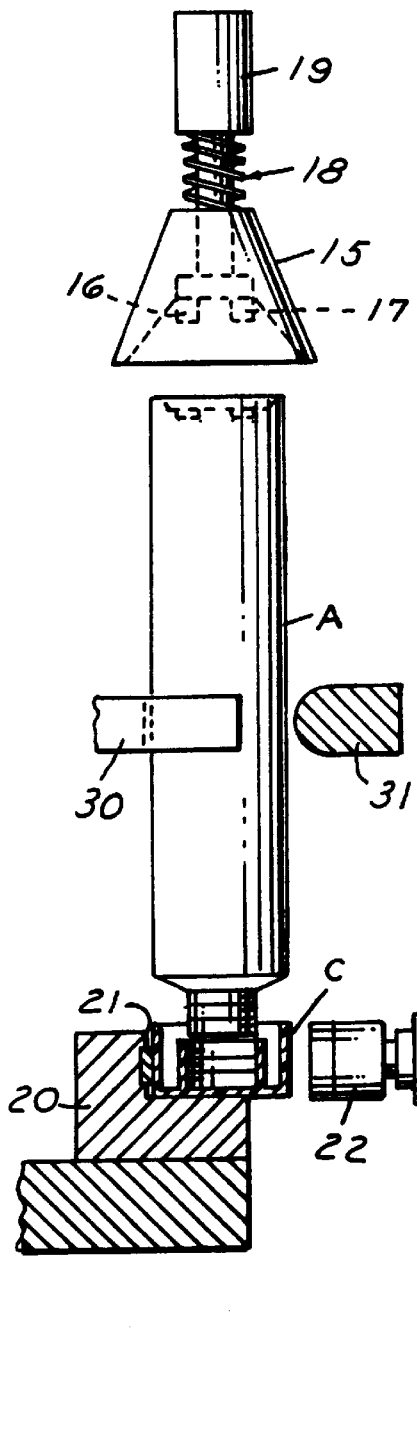
FIG. 7 is a fragmentary part sectional view of a preferred method and apparatus for applying the closure.
Figure 8:
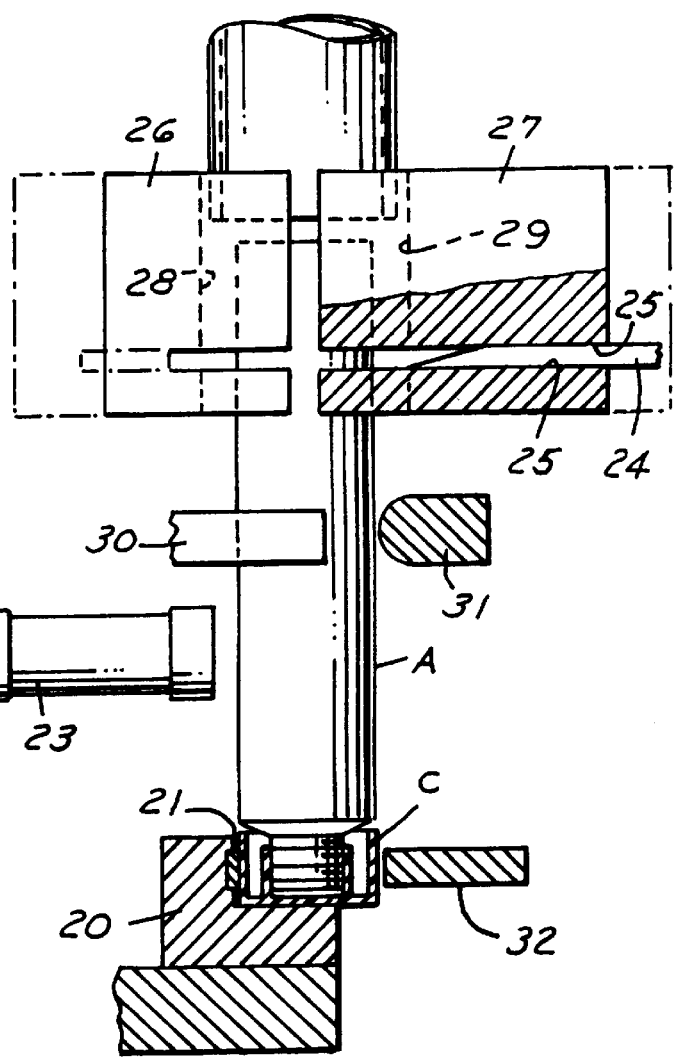
FIG. 8 is a fragmentary part sectional elevational view of an apparatus for severing the bottom from the container after it is decorated.

Referring to FIGS. 7 and 8, a preferred form of apparatus is shown in a copending application Ser. No. 08/356,936 filed Dec. 15, 1994, now U.S. Pat. No. 5,621,960 having a common assignee with the present application, incorporated herein by reference.

Referring to FIG. 8, the apparatus for severing the bottom of a container comprises a lower star wheel 20 having recesses 21 for receiving the closures C on the inverted containers A and an associated guide rail 32. The apparatus also includes an upper star wheel 30 with recesses for the container body 34 and an associated guide rail 31. The upper end of the container is clamped by blocks 26, 27 having recesses 28, 29 which are movable relative to one another to hold the upper end of the container A. A guillotine blade 24 is movable across the bottom of the closure by a cylinder to sever the bottom of the container A along a plane that is at 90° to the vertical or longitudinal axis of the container A. The guillotine 24 is guided by guide surfaces 25 in the blocks 26, 27.

The apparatus of FIG. 7 is preferably positioned at a capping station adjacent a rotary turret 30 which is driven intermittently past the capping station to apply the container to the closure. The apparatus shown in FIG. 8 is located at a trimming station and the turret 30 moves the inverted containers past the trimming station to sever the bottom of the container. A guide rail 32 retains the lower end of the capped container in recesses the lower star wheel during severing of the bottom of the container.

It can thus be seen that there has been provided a method of forming a flexible plastic tube comprises injection molding a finish having an opening, extruding a tube integrally with the finish by relevant movement of the finish with respect to an extruder orifice, moving the finish axially away from the extruder orifice while continuing continuously extruding the tube, closing a blow mold about the extruded tube, blowing the tube into an integral container body having a closed bottom, opening the molds to provide an integral flexible tube with a finish thereon. Thereafter the method consists of decorating the body with indicia, and cutting the closed end of the tube leaving an open-ended tube of the end opposite the finish, and applying a closure to the finish. A closure is applied either before or after cutting the bottom from the container. Preferably the closure is applied to the finish after decorating. Subsequently, the tube is filled through the open end and the open end is sealed. The step of decorating includes rotating the tube about the longitudinal axis of the tube while engaging the finish and bottom. The step of decorating preferably comprises rotating the container relative to a silk screen printing device. The step of injection molding and extrusion molding preferably comprises injecting and extruding linear low density polyethylene. However, high density polyethylene and low density polyethylene may be used.

We claim:

1. An intermediate molded plastic article for use in making an open-ended tube for dispensing viscous products, said article comprising:

a flexible tubular body portion of substantially uniform wall thickness, said body portion being empty and having an integrally molded closed bottom portion, a finish and a shoulder portion integrally molded with said body portion, with said shoulder portion interconnecting said finish with said side wall, and a closure threadably received on said finish closing said empty body portion.

2. The intermediate plastic article set forth in claim 1 wherein said shoulder portion and bottom portion have a greater thickness than said tubular body portion.

3. The intermediate plastic article set forth in claim 2 wherein said intermediate plastic article has the body portion decorated.

4. The intermediate plastic article set forth in claim 3 wherein said body portion is decorated by silk screen.

5. The intermediate plastic article set forth in claim 3 wherein said article is decorated by an in-mold label.

6. The intermediate plastic article set forth in claim 3 wherein said article is decorated by a label.

7. The open ended tube set forth in claim 1 wherein said shoulder portion is thicker than said tubular body.

8. The intermediate plastic article set forth in claim 2 wherein said integral closed bottom portion has indentation means for engagement to rotate the article.

* * * * *